United States Patent [19]

Fukushima

[11] Patent Number: 5,297,839

[45] Date of Patent: Mar. 29, 1994

[54] RECLINING SEAT WITH MOVABLE ARMRESTS

[75] Inventor: Mitsuru Fukushima, Akishima, Japan

[73] Assignee: Tochi-S Co., Ltd., Akishima, Japan

[21] Appl. No.: 977,656

[22] Filed: Nov. 17, 1992

[51] Int. Cl.$^5$ .............................................. A47C 13/00
[52] U.S. Cl. ................................. 297/117; 297/411.32
[58] Field of Search ............... 297/117, 113, 417, 421, 297/422, 115, 411.3, 411.32, 411.44, 411.2

[56] References Cited

U.S. PATENT DOCUMENTS

| | | | |
|---|---|---|---|
| 2,249,849 | 7/1941 | Owler | 297/113 |
| 4,097,088 | 6/1978 | Meiller | 297/417 |
| 4,466,664 | 8/1984 | Kondou | 297/417 |
| 4,881,778 | 11/1989 | Stephensen | 297/417 |
| 4,978,170 | 12/1990 | Pelz | 297/417 |
| 5,131,721 | 7/1992 | Okamoto | 297/417 |

Primary Examiner—Paula A. Bradley
Assistant Examiner—James Miner
Attorney, Agent, or Firm—Oldham, Oldham & Wilson Co.

[57] ABSTRACT

A reclining seat with movable armrest, with such an arrangement wherein a seat back of the seat, which is provided with the movable armrest, is coupled via first and second connecting arm to a reclining device, and the first connecting arm supports both seat back and armrest, while the second connecting arm connects the first connecting means with the reclining device, whereby a total width of both seat back and armrest is made qual to a width of seat cushion. Thus, the armrest, if located at an upright non-use position along the seat back, may serves as one of the seat back at such total width equal to that of the seat cushion.

8 Claims, 3 Drawing Sheets

5,297,839

RECLINING SEAT WITH MOVABLE ARMRESTS

BACKGROUND OF INVENTION

1. Field of the Invention

The present invention relates to a reclining seat for use in an automobile, with a pair of movable armrests provided at the respective both lateral sides of seat back of the seat, in which the seat back is inclinable forwardly and backwardly relative to a seat cushion by means of a reclining device, and the armrests are rotatable forwardly and backwardly relative to the seat cushion, independent of the seat back.

2. Description of Prior Art

As shown in FIG. 1, there has been known an automotive reclining seat with a pair of movable armrests provided the respective both lateral sides of a seat back. Namely, according to the hitherto seat of this kind as in FIG. 1, a pair of independent seat backs (SB)(SB) are connected to the backward end of a seat cushion (SC) by means of a pair of reclining devices (RD)(RD), respectively, such that each of the two seat backs (SB)(SB) may be inclined independently of each other by operating corresponding one of the two reclining devices (RD)(RD). The reclining devices (RD)(RD) are each provided at the respective both lateral sides of the seat cushion (SC'). As indicated by the phantom line, the reclining device (RD) has an upper arm (RD2) fixed to the seat back (SB) and a lower arm (RD1) fixed to the seat cushion (SC'). Thus, as viewed from FIG. 1, each of the left and right seat backs (SB)(SB) may be inclined adjustably in the fore-and-aft direction by operation of the corresponding one of the left and right reclining devices (RD)(RD).

A pair of movable armrests (A')(A') are each mounted at the respective outward lateral sides of the two seat backs (SB)(SB), via their respective support shafts (A2'), such as to be rotatable between the upright non-use position where the armrest is located upright along the lateral side of the seat back, and the horizontal use position where the armrest lies horizontally in parallel with the upper surface of seat cushion. Each of the movable armrests (A')(A') has a push button (A4') provided at its forward end. Depressing the push button (A4) releases the locked state of the armrest (A') at the upright non-use position, so that the armrest (A') may be disposed from the non-use position down to the horizontal use position.

With the above-described construction, in view of the armrest (A') being mounted laterally of the seat back (SB), it is inevitably required to dispose the reclining device (RD) under the armrest (A') in order that the upper arm (RD2) of reclining device (RD) is fixed on the lateral wall of seat back (SB). This, in turn, requires forming a cut-away area (SC5) at the backward lateral portion of seat cushion (SC') in order to accommodated therein the reclining device (RD) so that the lower arm (RD1) thereof, which extends generally on the same line with the upper arm (RD2), is fixed on the lateral wall of seat cushion (SC').

Although not shown clearly, the cut-away area (SC5) is formed on both backward lateral portions of seat cushion (SC'), and thus there are a pair of such cut-away areas, on the left and right sides, to thereby accommodate therein the two reclining devices (RD)(RD), respectively.

However, such formation of cut-away areas (SC5) results in producing the narrow width (W1) in the backward end region of seat cushion (SC') in comparison with the original width (W2) of seat cushion (SC'). Namely, when the armrest (A) is located at the upright non-use position, the reclining device (RD) is found situated at the end of the narrow width (W1), which actually narrows the seating area in that width, with the result that an occupant sitting on the seat has to feel uncomfortable or cramped with such limited seating area, and will contact the reclining device (RD), feeling uneasy with its hard touch.

Furthermore, in spite of the fact that the armrest (A) per se, when held at the upright non-use position, may be used as a part of the seat back (SB) to enlarge the back support surface area for supporting the back of a passenger on the seat, the presence of the reclining device (RD) under the armrest (A) is indeed an obstacle preventing the passenger from leaning against the surface of armrest (A).

SUMMARY OF THE INVENTION

In view of the above-stated drawbacks, it is a purpose of the present invention to provide an improved reclining seat with movable armrest, which eliminates the foregoing narrow width in the seat cushion so that a passenger may comfortably sit on the seat, using a full seating surface area of both seat back and seat cushion while further providing a simple robust structure for achieving such effect.

To accomplish this purpose, in accordance with the present invention, there is basically provided a reclining seat comprising a seat cushion, a seat back which is connected via a reclining device to the seat cushion, the reclining device including a movable arm and a fixed arm, an armrest provided at the seat back, a first connecting means which is disposed between the seat back and armrest such that the seat back is fixed to the first connecting means, whereas the armrest is rotatably supported on the same connecting means, and a second connecting means which is disposed between the first connecting means and reclining device, such as to connect said first connecting means with the movable arm of the reclining device, wherein, by virtue of both said first and second connecting means, said reclining device is not only mounted on the seat cushion, but also coupled via the armrest to the seat back, and wherein a total width of the seat back and armrest is equal to a width of the seat cushion.

Preferably, the first connecting means includes a pair of upwardly projected support portions, one of which is for fixedly supporting the seat back, and another of which is for supporting the armrest rotatably, independent of the seat back, while the second connecting means extends horizontally from the first connecting means towards the movable arm of the reclining device. For example, the first connecting means may comprise a generally U-shaped connecting arm, and the second connecting means may comprise a box-like or cylindrical connecting arm. Those arrangements permit direct use of ordinary seat cushion without need to form the cut-away portion therein as in the prior art and provides a simplified robust construction to the first and second connecting means by which the seat back with the armrest is integrally coupled to the reclining device. Further, the armrest per se, when held at the upright non-use position, can be used as a part of the seat back to enlarge the back support surface area for supporting the back of a passenger on the seat. To this end, preferably, both armrest and seat back should be identical to each other in cross-sectional thickness, and the second connecting means be disposed beneath the armrest.

DETAILED DESCRIPTION OF PREFERRED EMBODIMENT OF THE INVENTION

Referring to FIGS. 2 through 6, there is shown a reclining seat with movable armrests in accordance with the present invention.

Figure 1:
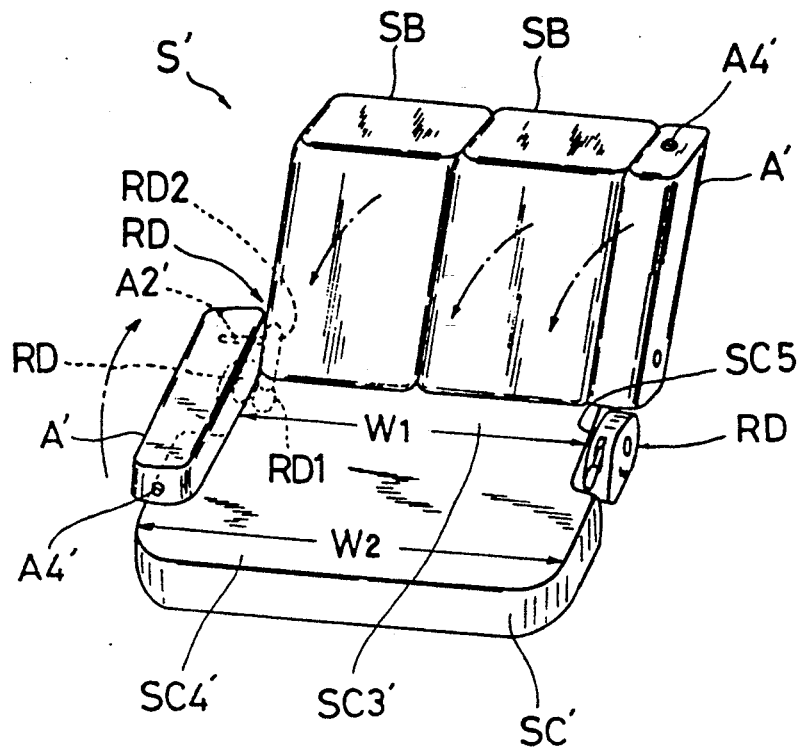
FIG. 1 is a schematic perspective view of a conventional reclining seat with armrests.
Figure 2:
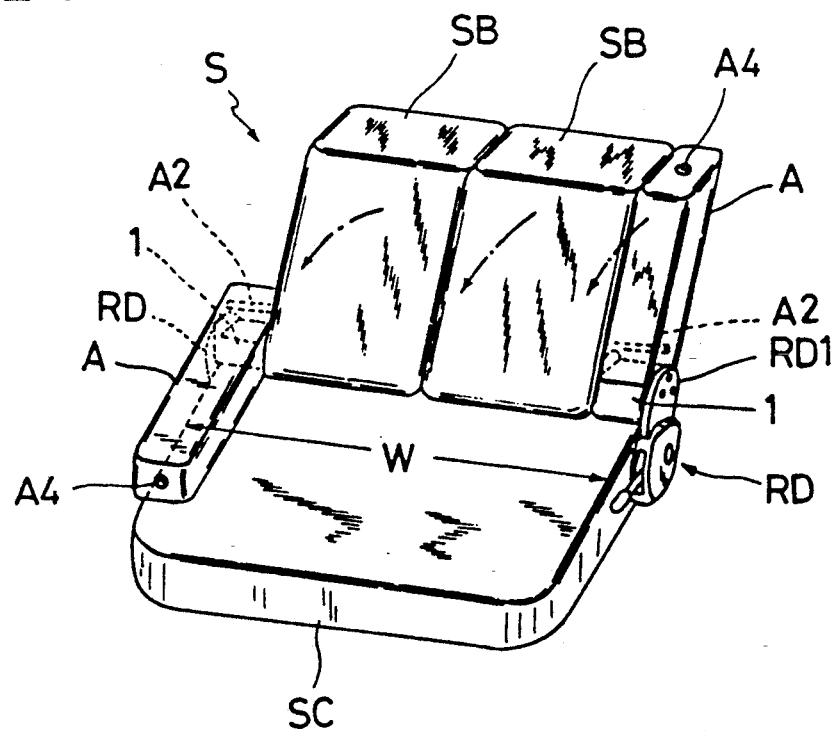
FIG. 2 is a schematic perspective view of a reclining seat with armrests in accordance with the present invention.

As similar to the previously mentioned prior-art reclining seat (S') with two movable armrests (A')(A'), the embodiment in FIG. 2 shows the same type of reclining seat (S) comprising one seat cushion (SC), a pair of seat backs (SB)(SB), a pair of movable armrests (A)(A), and a pair of reclining devices (RD)(RD).

Those two seat backs (SB)(SB) may be inclined forwardly and backwardly relative to the seat cushion (SC), independently of each other, by operation of a corresponding one of the two reclining devices (RD)(RD), as will be explained later.

The two movable armrests (A)(A) are each mounted, via its support shaft (A2), upon the respective outer lateral walls of the two seat backs (SB)(SB), such that the armrests (A)(A) may be rotated about their respective shafts (A2)(A2) between the upright non-use position where the armrest is located upright along the lateral wall of seat back, and the horizontal use position where the armrest lies horizontally in parallel with the upper surface of the seat cushion. Each of the armrests (A)(A) has a push button (A4) provided at its forward end. Depressing the push button (A4) releases the locked state of the armrest (A) at the upright non-use position, so that the armrest (A) may be disposed from the non-use position down to the horizontal use position. This locking mechanism is well known, and further description is omitted thereon.

The armrests (A)(A) are rotatable independent of the seat backs (SB), as will be explained later.

However, as is apparent from FIG. 2, the seat cushion (SC) is of a generally rectangular shape having a uniformly expanded plan on its upper surface and thus having only one width (w), in contrast to the seat cushion (SC') of the prior-art seat (S') in which the narrow width (w1) is defined due to the cut-away portions (SC5).

In accordance with the present invention, a special construction is introduced between the seat backs (SB) and seat cushion (SC) in order to permit use of such simple rectangular seat cushion (SC). Hereinafter, a specific description will be made thereof.

Figure 3:
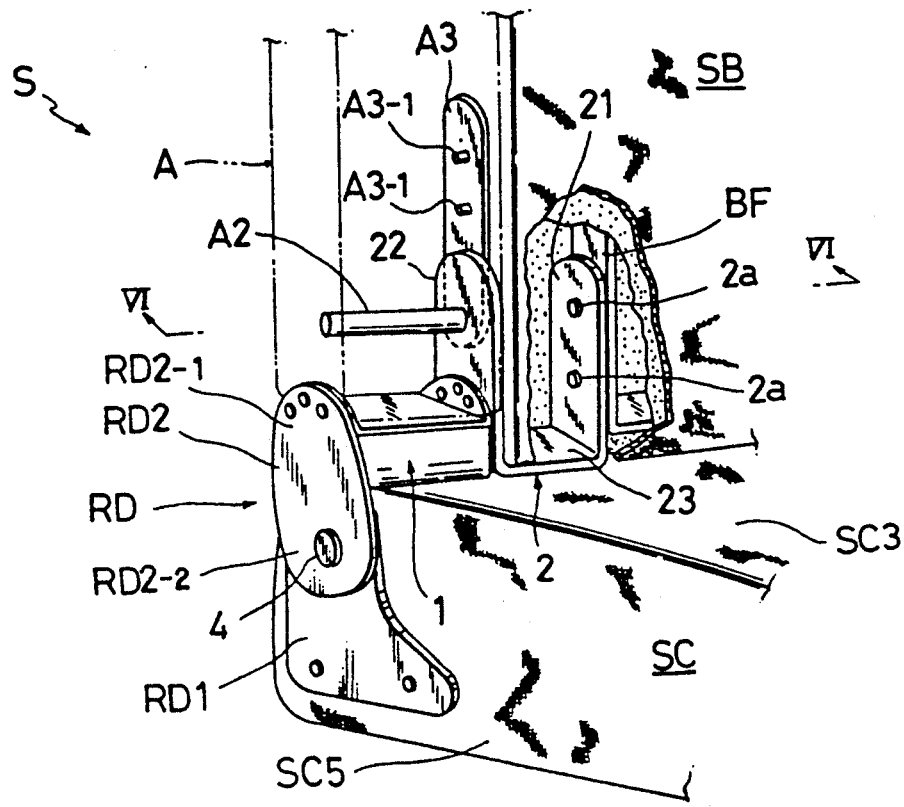
FIG. 3 is a partly exploded schematic perspective view of a principal part of the reclining seat as in FIG. 2.

Reference is made to FIG. 3 which only shows the left-side seat back (SB) and various constituent elements therein. It should however be understood that such construction is also arranged likewise at the right-side portion of sat (S), as can be seen from FIG. 2. But, the description will be given only in regard to the left-side seat back (SB), for the sake of simplicity.

As known in the state of art, a reclining device (RD) is provided at the lateral wall (SC5) of seat cushion (SC). FIG. 3 shows an upper arm (RD2) and lower arm (RD1) as a part of the reclining device (RD). The lower arm (RD1) is fixed to the seat cushion lateral wall (SC5). The upper arm (RD2) is connected pivotally to the lower arm (RD1) by means of a shaft (4). Although not shown, operation of the reclining device (RD) causes the upper arm (RD2) to be rotated forwardly and backwardly about the shaft (4).

Designation (2) represents a first connecting arm of a generally U-shaped configuration, comprising a right-side vertical arm section (21), a left-side vertical arm section (22) and a horizontal arm section (23). As in FIG. 3, this first connecting arm (2) is disposed between the seat back (SB) and armrest (A), in such a manner that the left-side vertical arm section (22) of the arm (2) lies exteriorly and laterally of the seat back (SB), while the right-side vertical arm section (21) of the arm (2) lies inside of the seat back (SB), with the horizontal arm section (23) thereof in contact with the upper surface of seat back (SB).

Figure 6:
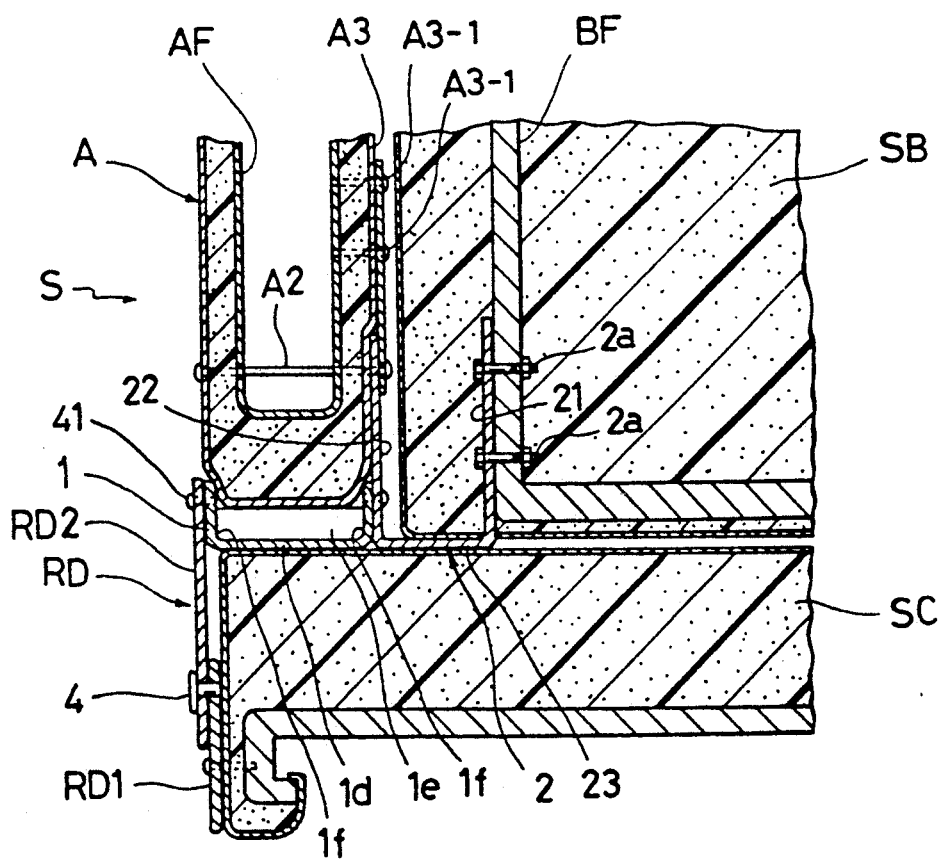
FIG. 6 is a partly broken sectional view taken along the line VI—VI in FIG. 3.

As viewed from FIGS. 3 and 6, the seat back frame (BF) embedded in the seat back (SB) is fixedly connected to the foregoing right-side vertical arm section (21) by means of fixing screws (2a)(2a).

On the other hand, rotatably supported on the foregoing left-side vertical arm section (22), is the support shaft (A2) passing through the lower part of the armrest (A). As best shown in FIG. 6, the right-side end of the support shaft (A2) is fixed to the corresponding right-side wall of the armrest (A), while the left-side end thereof passes rotatably through a hole (not indicated by a designation) of the left-side vertical arm section (22) and is fixed to the lower end portion of armrest bracket (A3). Accordingly, it is seen that the upper part of the left-side vertical arm section (22) is connected between the lower end of the arm bracket (A3) and the left-side wall of armrest (A). Further, the armrest bracket (A3) is at its upper portion fixed tot he right-side wall of armrest (A): Namely, as shown, the upper portion of armrest bracket (A3) is firmly connected, via two fixing bolts (A3-1)(A3-1), with the armrest frame (AF) in the armrest (A). Hence, the armest (A) is stably connected to the first connecting arm (2) and not removed therefrom, while being rotatable upon the shaft (A2).

Figure 4:
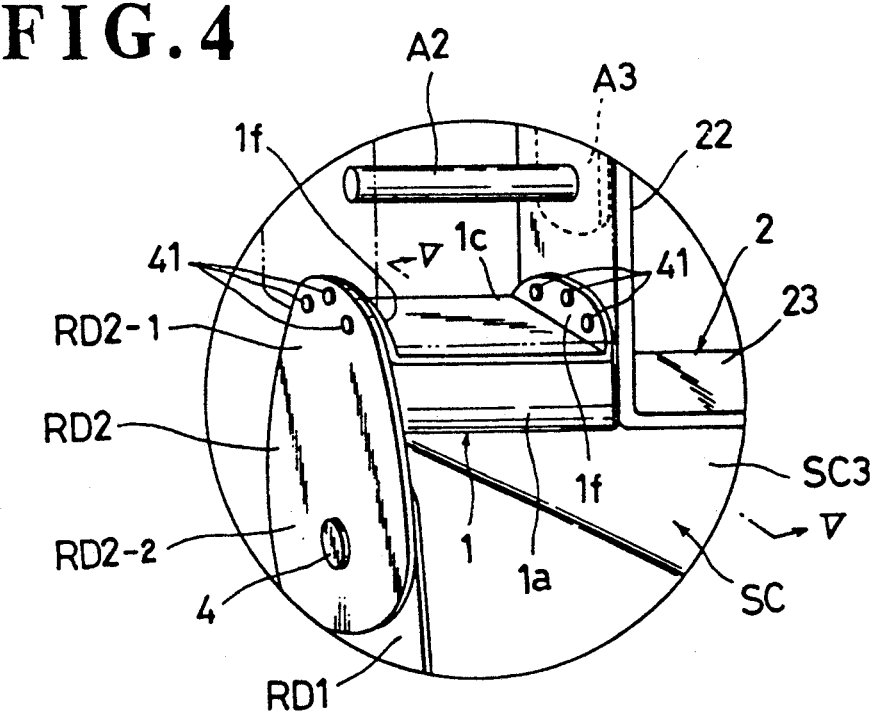
FIG. 4 is a partially enlarged view of the principal part of reclining seat as in FIG. 3.
Figure 5:
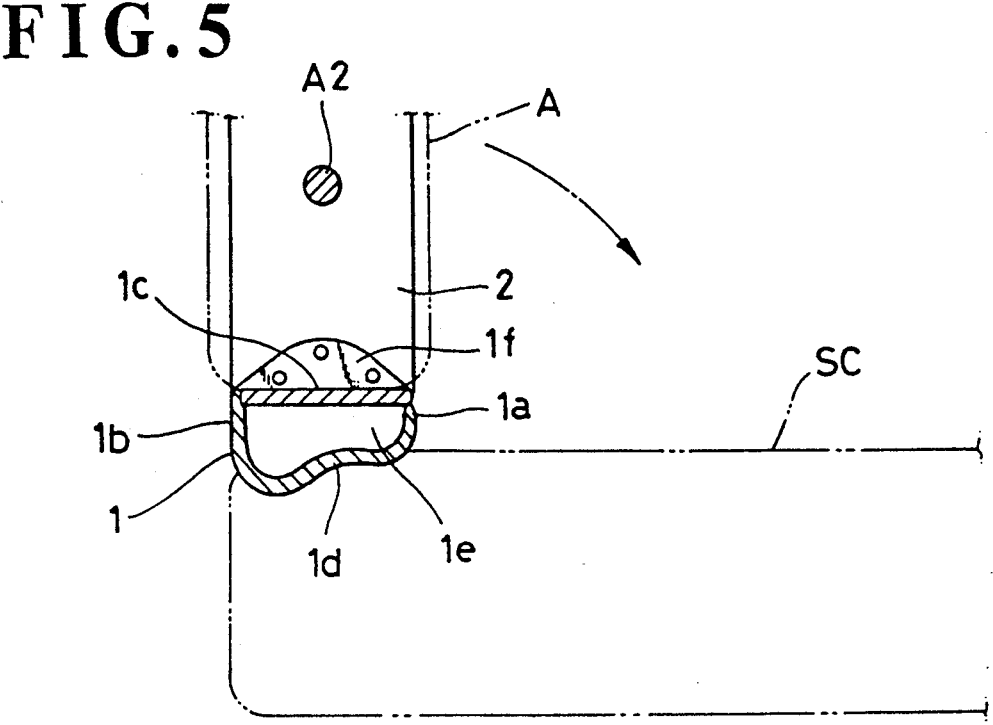
FIG. 5 is a schematic sectional view taken along the line V—V in FIG. 4.

Disposed between the first connecting arm (2) and reclining device upper arm (RD2), is a second connecting arm (1) formed in a box-like configuration. As best shown in FIGS. 4 and 5, the second connecting arm (1) is formed by a forward wall (1a), a backward wall (1b), a top wall (1c), a bottom wall (1d), a right lateral wall (1f) and a left lateral wall (1e), such that all of those walls are integral with one another.

The right and left walls (1f)(1e) of the second connecting arm (1) are respectively firmly connected to the left-side arm section (22) of first connecting arm (2) and the upper end part (RD2-1) of reclining device upper arm (RD2), by means of fixing bolts (41).

It is therefore seen that the seat back (SB) is firmly or integrally connected with the upper arm (RD2) of reclining device (RD) through the first and second connecting arms (2)(1), whereupon by operating the reclining device (RD), both seat back (SB) and armrest (A) may be rotated about the shaft (4) in the fore-and-aft direction relative to the seat cushion (SC), as indicated by the arrow in FIG. 2.

As best seen in FIG. 5, while the top wall (1c) is flat for receipt of the rearward end surface of armrest (A), the bottom wall (1d) is generally of a wavy stepped cross-section such that the forward wall (1a) is smaller in height-wise width than the backward wall (1b). Therefore, as understandable in the cross-section, the backward half part of the bottom wall (1d) swells downwardly, assuming a downwardly projected arcuate surface, while by contrast the forward half part of same assumes a a generally flat surface. Since the backward half part of bottom wall (1d) is normally pressed relatively deeply into the elastic upper surface of seat cushion (SC) and the forward half part thereof lies in a slightly pressing contact with the same seat cushion upper surface, it is to be appreciated that there is no clearance beneath the armrest (A) with respect to the seat cushion upper surface, when the seat back (SB) is in the normal upright position, and that, even when the seat back (SB) is inclined by operation of the reclining device (RD) forwardly towards the seat cushion (SC), the forward wall (1a) of second connecting arm (1) is pressed into the seat cushion upper surface, thereby keeping closed any clearance beneath the armrest (A). Additionally, the small height-wise thickness of the forward half part of second connecting arm (1) facilitates the ease with which the seat back (SB) is inclined forwardly and backwardly relative to the seat cushion (SC).

Preferably, both first and second connecting arms (2)(1) should be made of a steel material or other suitable rigid materials.

With the above-described structure, the reclining device (RD) can not only be mounted at the original flat lateral wall of seat cushion (SC), but also be coupled firmly to the seat back (SB), without need to form any cut-away area (SC5) in the backward lateral wall of seat cushion as in the prior art. Accordingly, it is possible to attain such a full width (w) upon the upper surface area of seat cushion (SC), as opposed to the prior art seat (S') having the narrow width area (w1), so that, with the armrest (A) located at the upright non-use position, an occupant on the seat (1) enjoys a fully comfortable seating posture upon the seat cushion. In addition, as the box-like configuration and U-shaped configuration are given, respectively, to the second and first connecting arms (1)(2), the rigidity and strength of those arms (1)(2) are reinforced effectively against a fore-and-aft rotation force applied thereto from the the reclining device (RD) as well as any other load applied thereto such as a weight of passenger on the seat.

It is still further important to note that, when the armrest (A) is located at the upright non-use position, the frontal vertical wall of armrest (A) not only lies flush with the frontal surface of seat back (SB) but also lies flush with the forward wall (1a) of the second connecting arm (1), as can be seen from FIG. 2, whereby a frontal surface areas of those armrest (A) and second connecting arm forward wall (1a) are added to the frontal surface area of seat back, thus enlarging the back support area of seat back (B) by a total width substantially equal to that (w) of seat cushion (SC). Naturally, therefore, a passenger can comfortably lean against such enlarged back support areas as he or she sits on the seat cushion (SC). For that purpose, both armrest (A) and second connecting arm (1) should preferably be of the same thickness with that of the seat back (SB).

While having described the present invention as above, it should be understood that the invention is not limited to the illustrated embodiment, but any other modifications, replacements and additions may be structurally applied thereto without departing from the scopes of the appended claims.

What is claimed is:

1. A reclining seat comprising:
   a seat cushion;
   a seat back which is connected to said seat cushion via a reclining device;
   said reclining device including a movable arm and a fixed arm;
   an armrest provided rotatably at said seat back; and
   a connecting means extending from said seat back to said movable arm, said connecting means extending from a first side of said armrest to a side of said armrest opposite to said first side, said connecting means having a width generally equal that of said armrest, said connecting means being at one end thereof fixed to said movable arm of said reclining device and at another end thereof connected to said seat back, so that said reclining device is connected by said connecting means to said seat back, thereby allowing said armrest to be mounted at said seat back without need for narrowing a width of said seat back.

2. The reclining seat as set forth in claim 1 wherein said connecting means has a hollow in the cross-section.

3. The reclining seat as set forth in claim 1 wherein:
   (a) said seat back has a width smaller than that of said seat cushion;
   (b) said armrest is rotatably provided at one side of said seat back;
   (c) said connecting means is disposed beneath said armrest; and
   (d) whereupon all said seat back, armrest and connecting means cooperate with one another to provide a width equal to that of seat cushion, thereby allowing said armrest to be mounted at said seat back without need for narrowing the width of said seat cushion close to that of said seat back.

4. The reclining seat according to claim 1, wherein said connecting means compiises a connecting member has defined therein, a forward wall, backward wall, a pair of lateral walls, a top wall and a bottom wall, wherein said connecting member is disposed beneath said armrest, such that, when said armrest is located at an upright non-use position where it lies generally vertically along said seat back, said top wall of said connecting member receives a lower end of said armrest and further said forward wall of the same provides a surface flush with a frontal surface of said seat back, whereby all said seat back, armrest and connecting member cooperate with one another to provide a full frontal surface area having a width equal to the width of said seat cushion.

5. The reclining seat according to claim 4, wherein said top wall of said connecting member is formed flat, and said bottom wall thereof is formed in a wavy stepped configuration in cross-section, thus defining therein a downwardly arcuate backward half part and an upwardly offset forward half part, whereby said forward wall of said connecting member is smaller in height-wise width than said backward wall thereof.

6. The reclining seat according to claim 5, wherein said connecting means comprises a pair of left and right connecting members, each having a width generally equal to those respectively of said pair of left and right armrests.

7. The reclining seat according to claim 6, wherein further connecting means is provided at said seat back, said further connecting means comprises a generally U-shaped connecting member having a pair of upwardly projected support portions, one of which is for fixedly supporting said seat back, and another of which is for supporting said armrest rotatably, wherein said connecting means is connected between said generally U-shaped connecting member of said further connecting means and said movable arm of said reclining device, whereby said seat back is connected by said connecting means and generally U-shaped connecting member to said reclining device.

8. The reclining seat according to claim 1, wherein said armrest is disposed laterally of said seat back and rotatable forwardly and backwardly relative to said seat cushion such as to be displaceable between an upright non-use position where said armrest lies generally vertically along said seat back and a horizontal use position where said armrest lies generally in parallel with said seat cushion, and wherein, said armrest, when located at said upright non-use position, presents a surface flush with a frontal surface of said seat back, thus serving as a part of said seat back.

* * * * *